United States Patent
Hoshino et al.

(10) Patent No.: US 8,086,927 B2
(45) Date of Patent: Dec. 27, 2011

(54) MIMO TRANSMITTING APPARATUS, MIMO RECEIVING APPARATUS, AND RETRANSMITTING METHOD

(75) Inventors: Masayuki Hoshino, Kanagawa (JP); Ryohei Kimura, Kanagawa (JP); Yasuaki Yuda, Kanagawa (JP); Tomohiro Imai, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1131 days.

(21) Appl. No.: 11/909,415

(22) PCT Filed: Mar. 27, 2006

(86) PCT No.: PCT/JP2006/306174
§ 371 (c)(1),
(2), (4) Date: Sep. 21, 2007

(87) PCT Pub. No.: WO2006/104104
PCT Pub. Date: Oct. 5, 2006

(65) Prior Publication Data
US 2009/0055701 A1    Feb. 26, 2009

(30) Foreign Application Priority Data
Mar. 29, 2005  (JP) .................................. 2005-095344

(51) Int. Cl.
*G08C 25/02* (2006.01)
*G06F 11/10* (2006.01)
(52) U.S. Cl. .......................... 714/748; 714/762; 370/252
(58) Field of Classification Search .................. 714/701, 714/704, 748, 751, 752, 762, 787, 788; 370/203, 370/206, 252; 375/261; 455/500
See application file for complete search history.

(56) References Cited

U.S. PATENT DOCUMENTS
7,093,184 B2 * 8/2006 Kim et al. ..................... 714/789
(Continued)

FOREIGN PATENT DOCUMENTS
EP          1 619801          1/2006
(Continued)

OTHER PUBLICATIONS

Ng, B.K.; Sousa, E.S.; , "Coded performance of spread space-spectrum multiple access for the MIMO forward link transmission," Global Telecommunications Conference, 2003. GLOBECOM '03. IEEE , vol. 3, no., pp. 1221-1225 vol. 3, Dec. 1-5 2003doi: 10.1109/GLOCOM.2003.1258433.*

(Continued)

*Primary Examiner* — Cynthia Britt
(74) *Attorney, Agent, or Firm* — Dickinson Wright PLLC

(57) ABSTRACT

A MIMO transmitting apparatus that achieves a flexible control in accordance with variation of a propagation environment to reduce the number of retransmissions is disclosed. An intra-code-word interleaver performs an interleave process on bits included in symbols to be simultaneously transmitted from a plurality of transmitting antennas. When performing the intra-code-word interleave process, the intra-code-word interleaver performs the interleave process in accordance with an interleave pattern notified from an interleave pattern table. A counter counts a number of retransmission requests, and outputs the number of retransmission requests to the interleave pattern table. The interleave pattern table stores interleave patterns to be used for the intra-code-word interleave process for the respective numbers of retransmission requests, and notifies the intra-code-word interleaver of an interleave pattern in accordance with the number of retransmission requests.

12 Claims, 10 Drawing Sheets

U.S. PATENT DOCUMENTS

| | | | |
|---|---|---|---|
| 7,673,225 B2 * | 3/2010 | Jeong et al. .................. | 714/800 |
| 2002/0046371 A1 * | 4/2002 | Halter .......................... | 714/702 |
| 2002/0116681 A1 * | 8/2002 | Amrani et al. ................ | 714/792 |
| 2003/0236080 A1 * | 12/2003 | Kadous et al. ............. | 455/226.1 |
| 2004/0123229 A1 * | 6/2004 | Kim et al. .................... | 714/800 |
| 2004/0199846 A1 | 10/2004 | Matsumoto et al. | |
| 2005/0128966 A1 * | 6/2005 | Yee .............................. | 370/310 |
| 2005/0180525 A1 * | 8/2005 | Hansen et al. ................ | 375/295 |
| 2005/0204258 A1 * | 9/2005 | Hansen et al. ................ | 714/755 |

FOREIGN PATENT DOCUMENTS

| | | |
|---|---|---|
| JP | 2003 304178 | 10/2003 |
| JP | 2004 72427 | 3/2004 |
| JP | 2004 112471 | 3/2004 |
| JP | 2004 297182 | 10/2004 |

OTHER PUBLICATIONS

Mckay, M.R.; Collings, I.B.; , "Layered space-frequency bit-interleaved coded modulation for MIMO systems," Personal, Indoor and Mobile Radio Communications, 2005. PIMRC 2005. IEEE 16th International Symposium on , vol. 2, no., pp. 1106-1110 vol. 2, Sep. 11-14, 2005 doi: 10.1109/PIMRC.2005.1651612.*

Jung-Fu Cheng; , "Performance of MIMO space-time coded discrete modulations .1. Introduction and flat-fading channels," Global Telecommunications Conference, 2002. GLOBECOM '02. IEEE , vol. 2, no., pp. 1177-1181 vol. 2, Nov. 17-21, 2002 doi: 10.1109/GLOCOM. 2002.1188382.*

Aksoy, K.; Aygolu, U.; , "Concatenated Trellis and Coordinate Interleaved Differential Space-Time Block Codes for OFDM," Wireless Communication Systems, 2007. ISWCS 2007. 4th International Symposium on , vol., no., pp. 21-25, Oct. 17-19, 2007 doi: 10.1109/ ISWCS.2007.4392294.*

PCT International Search Report dated Apr. 18, 2006.

Mitsuru Uesugi, et al.; "Dai 4 Sedai Ido Tsushin eno Tachi Hencho no Donyu ni Tsuite," 2001 nen The Institute of Electronics, Information and Communication Engineers Sogo Taikai Koen Ronbunshu Communication 1, Mar. 7, 2001, pp. 785, 786.

* cited by examiner

| NUMBER OF RETRANSMISSIONS | INTERLEAVE PATTERN |
|---|---|
| 0 | PATTERN 0 |
| 1 | PATTERN 1 |
| 2 | PATTERN 2 |
| ⋮ | ⋮ |

FIG.2

| NUMBER OF RETRANSMISSIONS | INTERLEAVE PATTERN SET | |
|---|---|---|
| | SWITCHING OF TRANSMITTING ANTENNA | SWITCHING BETWEEN HIGHER AND LOWER POSITIONS |
| 0 | PATTERN x0 | PATTERN y0 |
| 1 | PATTERN x1 | PATTERN y1 |
| 2 | PATTERN x2 | PATTERN y2 |
| ⋮ | ⋮ | ⋮ |

FIG.8

MIMO TRANSMITTING APPARATUS, MIMO RECEIVING APPARATUS, AND RETRANSMITTING METHOD

TECHNICAL FIELD

The present invention relates to a MIMO transmitting apparatus, MIMO receiving apparatus and retransmission method. More particularly, the present invention relates to a MIMO transmitting apparatus, MIMO receiving apparatus and retransmission method which interleave bits to be transmitted and randomizes errors.

BACKGROUND ART

Recently, MIMO (Multi Input Multi Output) communication is attracting attention in wireless communication as a technique that makes it possible to improve spectral efficiency. In MIMO communication, a transmitting apparatus having a plurality of transmitting antennas transmits at the same time streams formed with a plurality of bits from the transmitting antennas, and a receiving apparatus having a plurality of receiving antennas demultiplexes the streams from the transmitting apparatus and demodulates the demultiplexed streams. Therefore, when mutually different streams are transmitted at the same time from all transmitting antennas of the transmitting apparatus, it is theoretically possible to improve spectral efficiency by equivalent times to the number of the transmitting antennas compared to a case where only one transmitting antenna is used.

Furthermore, as disclosed in Patent Document 1, by providing differences in transmission power among the transmitting antennas, transmitting streams formed with bits having the high degree of importance from transmitting antennas having high transmission power and transmitting streams formed with bits having the low degree of importance from transmitting antennas having low transmission power, it is possible to improve the overall packet error rate (PER) performance in MIMO communication.

Moreover, Patent Document 1 discloses that, when a retransmission request is fed back from the receiving apparatus, the transmitting apparatus transmits streams from transmitting antennas different from the last transmission. By this means, it is possible to reduce the possibility that only specific streams may include errors consecutively and reduce the number of retransmissions.

Patent Document 1: Japanese Patent Application Laid-Open No. 2004-72427

DISCLOSURE OF INVENTION

Problems to be Solved by the Invention

However, in the above described conventional technique, only rough control such that transmitting antennas are switched in units of a stream is carried out, and there is a problem that improvement of PER performance and reduction in the number of retransmissions are limited. That is, when transmitting antennas are switched for each retransmission, the transmitting antennas are switched, for example, in units of a stream formed with a group of bits in error correction coding, and therefore flexible control cannot be carried out, and control fails to keep up with the propagation environment which changes over time. As a result, the number of retransmissions may not be sufficiently reduced.

It is therefore an object of the present invention to provide a MIMO transmitting apparatus, MIMO receiving apparatus and retransmission method that make it possible to realize flexible control according to a change in a propagation environment and further reduce the number of retransmissions.

Means for Solving the Problem

The MIMO transmitting apparatus according to the present invention has a plurality of transmitting antennas and employs a configuration including: an error correction coding section that carries out error correction coding on information bits and generates transmission bits; an interleaving section that carries out interleaving in a codeword formed with bits transmitted at the same time from the plurality of transmitting antennas out of the generated transmission bits; and a transmitting section that transmits at the same time all bits included in the interleaved codeword from the plurality of antennas, wherein, when the codeword is retransmitted, the interleaving section carries out interleaving in the codeword using an interleave pattern different from last transmission.

The retransmission method according to the present invention for a multi input multi output transmitting apparatus that has a plurality of transmitting antennas, includes the steps of: carrying out error correction coding on information bits and generating transmission bits; carrying out interleaving in a codeword formed with bits transmitted at the same time from the plurality of transmitting antennas out of the generated transmission bits; transmitting at the same time all bits included in the interleaved codeword from the plurality of antennas; and carrying out interleaving in the codeword using an interleave pattern different from last transmission when the codeword is retransmitted.

According to the above apparatus and method, interleaving in codewords transmitted at the same time from a plurality of transmitting antennas is carried out by using an interleave pattern different for each retransmission, so that it is possible to carry out fine control in units of several tens of bits transmitted in one symbol time and equalize the occurrence of errors among bits for each retransmission. As a result, it is possible to realize flexible control according to a change in a propagation environment and further reduce the number of retransmissions.

Advantageous Effect of the Invention

According to the present invention, it is possible to realize flexible control according to a change in a propagation environment and further reduce the number of retransmissions.

BRIEF DESCRIPTION OF DRAWINGS

FIG. 2 shows an example of an interleave pattern table according to Embodiment 1;

FIG. 8 shows an example of an interleave pattern table according to Embodiment 2;

BEST MODE FOR CARRYING OUT THE INVENTION

A gist of the present invention includes performing interleaving in units of all bits transmitted at the same time from a plurality of transmitting antennas by using a different interleave pattern for each retransmission.

Hereinafter, embodiments of the present invention will be described in detail with reference to the attached drawings.

Embodiment 1

Figure 1:
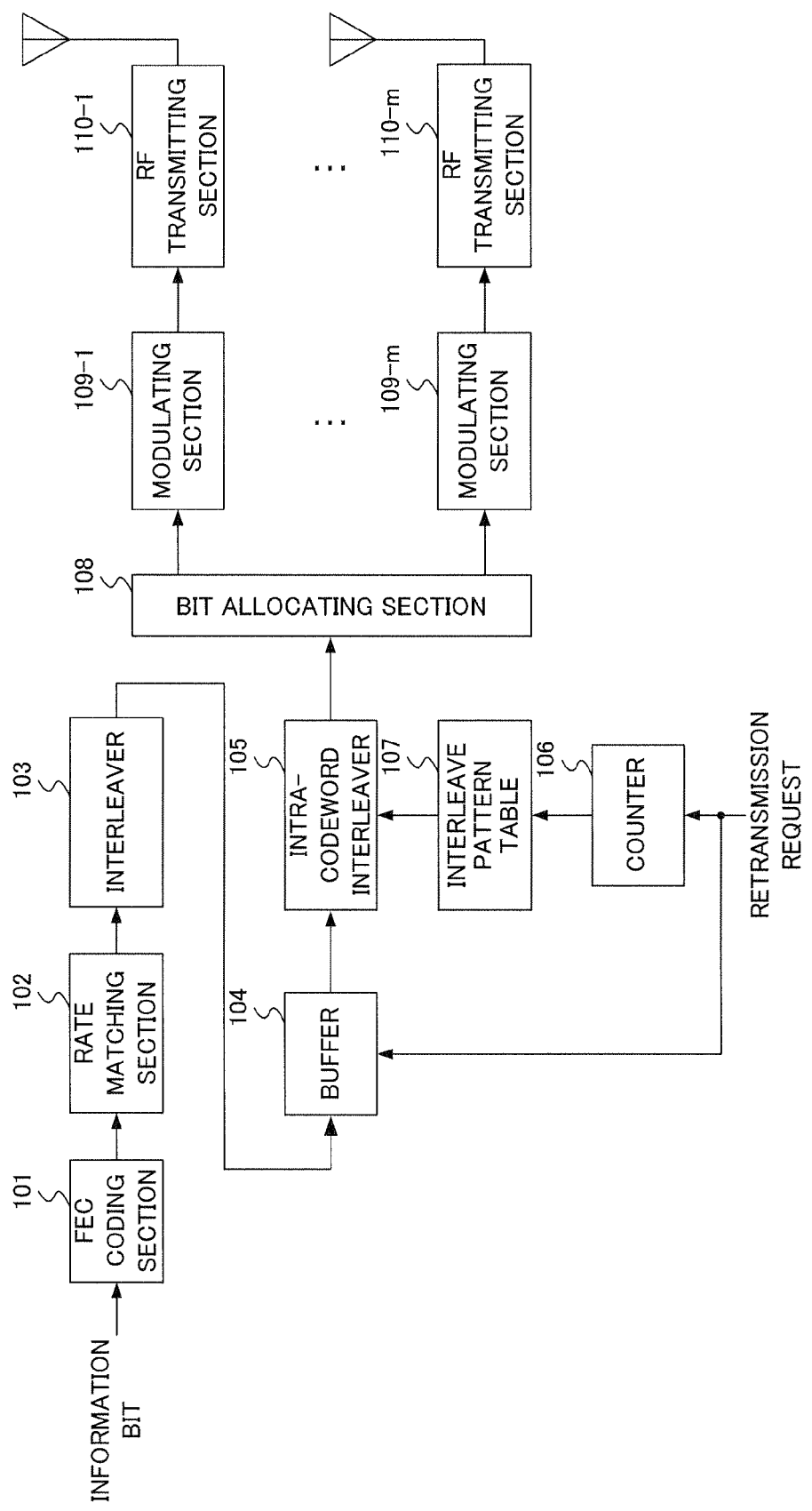
FIG. 1 is a block diagram showing the configuration of main components of a MIMO transmitting apparatus according to Embodiment 1 of the present invention.

FIG. 1 is a block diagram showing the configuration of main components of a MIMO transmitting apparatus according to Embodiment 1 of the present invention. The MIMO transmitting apparatus shown in FIG. 1 has FEC (Forward Error Correction) coding section 101, rate matching section 102, interleaver 103, buffer 104, intra-codeword interleaver 105, counter 106, interleave pattern table 107, bit allocating section 108, modulating sections 109-1 to 109-$m$ and RF (Radio Frequency) transmitting sections 110-1 to 110-$m$.

FEC coding section 101 carries out error correction coding on information bits and outputs transmission bits with redundant bits added to the information bits to rate matching section 102.

Rate matching section 102 carries out repetition and puncturing on the transmission bits and adjusts a coding rate of a transmission signal (rate matching).

Interleaver 103 rearranges (interleaves) the sequence of the information bits and redundant bits included in the transmission bits after the rate matching and improves resistance to burst errors.

Buffer 104 temporarily stores the interleaved transmission bits in preparation for retransmission. When a retransmission request is inputted from a MIMO receiving apparatus, which is a communicating party, buffer 104 outputs the stored transmission bits to intra-codeword interleaver 105.

Intra-codeword interleaver 105 carries out interleaving in units of all information bits and redundant bits included in the symbols transmitted at the same time from a plurality of transmitting antennas. When, for example, mutually different symbols modulated based on QPSK (Quadrature Phase Shift Keying) are transmitted at the same time from all transmitting antennas, intra-codeword interleaver 105 carries out interleaving in units of (2 bits×number of transmitting antennas) bits.

Further, for example, when mutually different symbols modulated based on QPSK and mutually different symbols modulated based on 16 QAM (Quadrature Amplitude Modulation) are transmitted at the same time from half of the transmitting antennas, respectively, intra-codeword interleaver 105 carries out interleaving in units of (2 bits×number of transmitting antennas/2+4 bits×number of transmitting antennas/2) bits. That is, the number of bits which becomes a unit of interleaving in intra-codeword interleaver 105 is determined based on the number of transmitting antennas and an M-ary modulation number.

However, when the same symbols are transmitted from a plurality of transmitting antennas, symbols transmitted from these transmitting antennas at the same time are collectively regarded as one. That is, for example, when the same symbols modulated based on QPSK are transmitted at the same time from all transmitting antennas, intra-codeword interleaver 105 carries out interleaving in units of 2 bits irrespective of the number of transmitting antennas. Hereinafter, this interleaving unit will be referred to as a "codeword."

Furthermore, upon performing interleaving in a codeword, intra-codeword interleaver 105 carries out interleaving according to the interleave pattern reported from interleave pattern table 107. As will be described later, interleave pattern table 107 reports an interleave pattern where bits in a codeword are rearranged to different positions for each retransmission.

Counter 106 counts a retransmission request from the MIMO receiving apparatus and outputs the number of retransmissions to interleave pattern table 107.

Interleave pattern table 107 stores interleave patterns corresponding to each number of retransmissions, used in intra-codeword interleaving and reports an interleave pattern corresponding to the number of retransmissions to intra-codeword interleaver 105. That is, for example, as shown in FIG. 2, interleave pattern table 107 stores interleave patterns of patterns 0, 1, 2, . . . associated with the number of retransmissions 0, 1, 2, . . . . Patterns 0, 1, 2, . . . corresponding to the number of retransmissions differ from one another, and bits in the codeword are rearranged to different positions for each retransmission.

Bit allocating section 108 allocates and outputs information bits and redundant bits included in the codeword to modulating sections 109-1 to 109-$m$. At this time, bit allocating section 108 allocates bits corresponding to one symbol according to the modulation schemes of modulating sections 109-1 to 109-$m$. That is, bit allocating section 108 outputs 2 bits to a modulating section that carries out modulation based on QPSK and outputs 4 bits to a modulating section that carries out modulation based on 16 QAM (Quadrature Amplitude Modulation). As described above, the codeword expresses all bits included in symbols transmitted at the same time from a plurality of transmitting antennas, and therefore bit allocating section 108 allocates symbol by symbol all bits included in the codeword to modulating sections 109-1 to 109-$m$.

Furthermore, bit allocating section 108 allocates bits taking into consideration the mutually different numbers of symbols transmitted at the same time from a plurality of transmitting antennas (hereinafter, referred to as "spatial multiplexing number"). Generally, when there are many independent paths in a channel between the MIMO transmitting apparatus and the MIMO receiving apparatus, symbols transmitted from a plurality of transmitting antennas can be accurately demultiplexed at the MIMO receiving apparatus. However, when there are not many independent paths in the channel, symbols transmitted from the transmitting antennas cannot be accurately demultiplexed.

Therefore, when there are many independent paths in the channel, mutually different symbols may be transmitted at the same time from a plurality of transmitting antennas, and spectral efficiency may be improved. On the other hand, when there are not many independent paths in the channel, the same symbols may be transmitted at the same time from a plurality of transmitting antennas, and an PER performance by diversity may be improved.

Therefore, when the same symbols are transmitted at the same time from a plurality of transmitting antennas, bit allocating section 108 duplicates the bits included in the codeword as appropriate, and outputs the bits to a modulating section corresponding to a transmitting antenna that transmits the same symbols at the same time. In other words, bit allocating section 108 allocates all bits included in the codeword corresponding to a spatial multiplexing number, duplicates the bits as appropriate and outputs the bits to modulating sections 109-1 to 109-$m$.

Modulating sections 109-1 to 109-$m$ modulate the bits outputted from bit allocating section 108 and generate symbols. The modulation schemes of modulating sections 109-1 to 109-$m$ may be the same or different from one another.

RF transmitting sections 110-1 to 110-$m$ carry out predetermined radio transmission processing (such as D/A conversion and up-conversion) on the symbols generated by modulating sections 109-1 to 109-$m$, and transmit the symbols after radio transmission processing from the corresponding transmitting antennas.

In the MIMO transmitting apparatus shown in FIG. 1, a control signal generating section (not shown) generates a control signal formed with coding information including the coding rate determined by rate matching section 102, priority of the information bits upon puncturing and transmission start positions of redundant bits, information of the number of retransmissions counted by counter 106, information of a spatial multiplexing number at bit allocating section 108 and information of modulation schemes of modulating sections 109-1 to 109-$m$, and transmits the control signal from RF transmitting sections 110-1 to 110-$m$ through the transmitting antennas.

Figure 3:
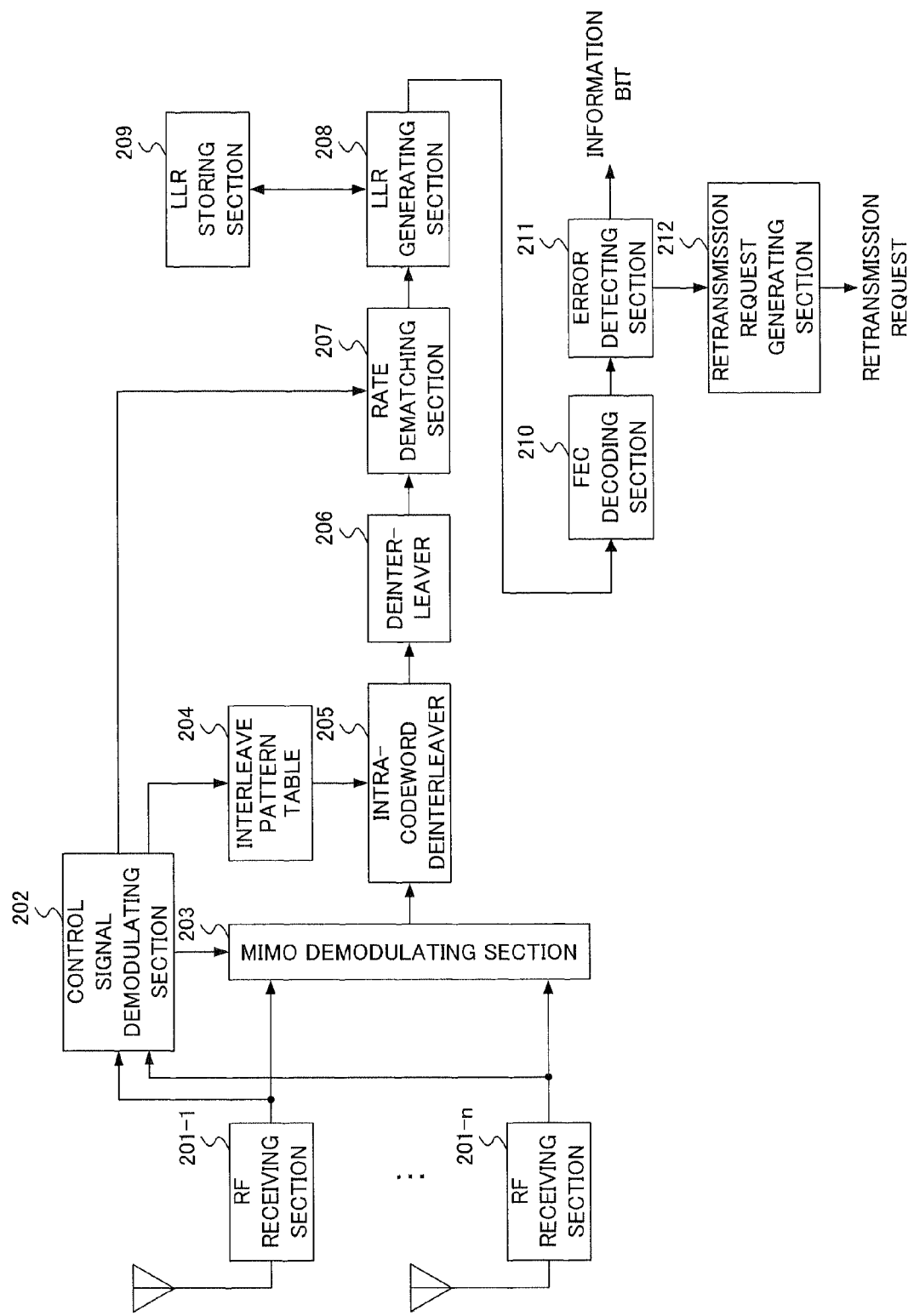
FIG. 3 is a block diagram showing the configuration of main components of a MIMO receiving apparatus according to Embodiment 1.

FIG. 3 is a block diagram showing the configuration of main components of a MIMO receiving apparatus according to Embodiment 1. The MIMO receiving apparatus shown in FIG. 3 has RF receiving sections 201-1 to 201-$n$, control signal demodulating section 202, MIMO demodulating section 203, interleave pattern table 204, intra-codeword deinterleaver 205, deinterleaver 206, rate dematching section 207, Log-likelihood-ratio (LLR) generating section 208, LLR storing section 209, FEC decoding section 210, error detecting section 211 and retransmission request generating section 212.

RF receiving sections 201-1 to 201-$n$ receive signals from corresponding receiving antennas and carry out predetermined radio reception processing (such as down-conversion and A/D conversion) on the received signals. The symbols transmitted from the transmitting antennas of the MIMO transmitting apparatus are mixed with the received signals received by RF receiving sections 201-1 to 201-$n$.

Control signal demodulating section 202 demodulates the control signal received at receiving antennas, reports information of the spatial multiplexing number and the modulation scheme included in the control signal to MIMO demodulating section 203, reports information of the number of retransmissions to interleave pattern table 204 and reports coding information to rate dematching section 207.

MIMO demodulating section 203 uses information of the spatial multiplexing number and the modulation scheme, demultiplexes and demodulates the symbols transmitted from the transmitting antennas on the transmitting side, and outputs to intra-codeword deinterleaver 205 the demodulated bits in units of the information bits and the redundant bits (that is, codeword) included in all symbols transmitted at the same time. When the same symbols are transmitted at the same time from a plurality of transmitting antennas, MIMO demodulating section 203 carries out, for example, maximum ratio combining on these symbols and demodulates the combined symbol.

Interleave pattern table 204 stores interleave patterns for each number of retransmissions used in intra-codeword interleaving in the same way as in interleave pattern table 107 of the MIMO transmitting apparatus. Interleave pattern table 204 reports an interleave pattern corresponding to the number of retransmissions to intra-codeword deinterleaver 205.

Intra-codeword deinterleaver 205 deinterleaves the interleaved codeword according to the interleave pattern reported from interleave pattern table 204. That is, intra-codeword deinterleaver 205 rearranges bits in the codeword interleaved using an interleave pattern different for each retransmission by intra-codeword interleaver 105 on the transmitting side so as to restore their original states.

Deinterleaver 206 stores the information bits and redundant bits after intra-codeword deinterleaving corresponding to a plurality of symbols and rearranges those bits so as to restore the original states before interleaved by interleaver 103 on the transmitting side.

Rate dematching section 207 deletes the bits subjected to repetition based on coding information and refills the punctured bits. Repetition and puncturing patterns can be uniquely determined based on the coding rate included in coding information, the priority of the information bits upon puncturing and the transmission start position of the redundant bits.

LLR generating section 208 carries out a soft decision on the bits after rate dematching, calculates LLR values corresponding to the bits and outputs the results to LLR storing section 209 and FEC decoding section 210. Furthermore, LLR generating section 208 combines the LLR values obtained by the last soft decision and the LLR value obtained by the soft decision this time for the retransmitted bits, and outputs the obtained combined LLR value to LLR storing section 209 and FEC decoding section 210.

LLR storing section 209 stores the LLR values or the combined LLR value generated by LLR generating section 208 in preparation for next retransmission.

FEC decoding section 210 carries out error correction decoding using the LLR values or the combined LLR value corresponding to the information bits and the redundant bits, carries out a hard decision on the LLR values corresponding to the information bits after error correction decoding, and outputs the obtained information bits to error detecting section 211.

Error detecting section 211 detects errors in the information bits using an error detection code such as a CRC (Cyclic Redundancy Check) code added to the information bits. Error detecting section 211 reports the error detection result to retransmission request generating section 212 and, when no error is detected, outputs the information bits as received data.

When an error is detected in the information bits as a result of error detection, retransmission request generating section 212 generates a retransmission request to be fed back to the MIMO transmitting apparatus. The generated retransmission request is transmitted from a transmission section (not shown) to the MIMO transmitting apparatus.

Figure 4:
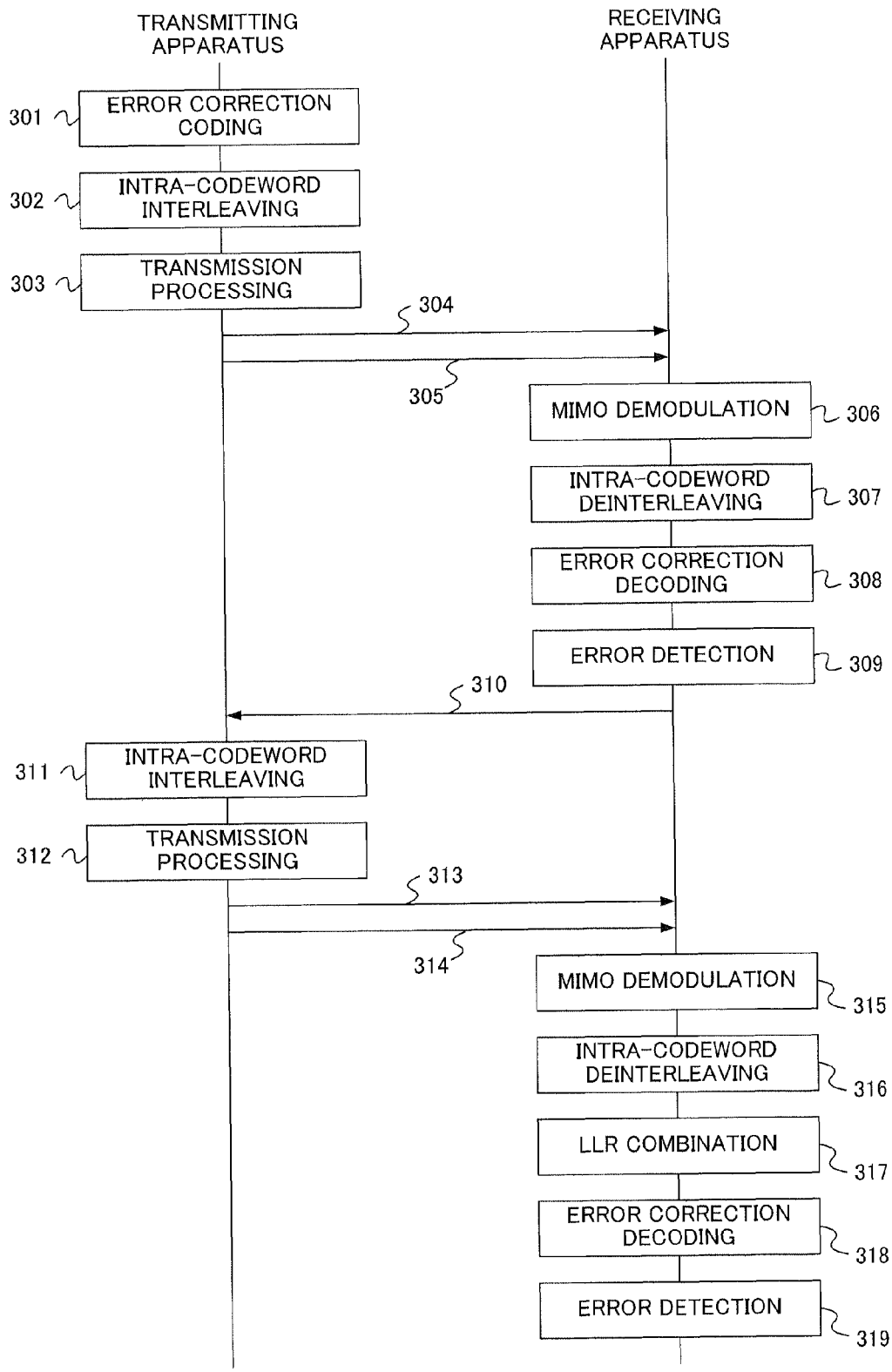
FIG. 4 is a sequence diagram showing operation involving retransmission according to Embodiment 1.

Next, a retransmission operation by the MIMO receiving apparatus having the above configuration will be described with reference to the sequence diagram shown in FIG. 4.

First, in the MIMO transmitting apparatus, information bits are subjected to error correction coding by FEC coding section 101 (301). Transmission bits formed with information bits and redundant bits are subjected to rate matching by rate matching section 102 and interleaving by interleaver 103.

The interleaved transmission bits are stored in buffer 104 in preparation for retransmission and are subjected to interleaving by intra-codeword interleaver 105 in units of bits which become symbols transmitted at the same time from a plurality of transmitting antennas, that is, a codeword (302). At this time, bits in the codeword are rearranged according to an interleave pattern for each number of retransmissions stored in interleave pattern table 107. Here, this is initial transmission, and intra-codeword interleaving is carried out according to an interleave pattern corresponding to the number of retransmissions 0. That is, when, for example, interleave pattern table 107 is as shown in FIG. 2, interleaving is carried out on bits in the codeword according to pattern 0 corresponding to the number of retransmissions 0.

When intra-codeword interleaving is carried out, bit allocating section 108 allocates bits in the codeword to the transmitting antennas. As described above, bits are allocated by bit allocating section 108 according to the modulation schemes and spatial multiplexing numbers at modulating sections 109-1 to 109-$m$. To be more specific, the bits corresponding to one symbol in the modulation schemes of the modulating sections are outputted to modulating sections 109-1 to 109-$m$. Furthermore, the bits constituting these symbols are duplicated, and the obtained same bits are outputted to the modulating sections corresponding to transmitting antennas which transmit the same symbols.

When bits corresponding to one symbol are thus outputted to modulating sections 109-1 to 109-$m$, the bits are subjected to transmission processing such as modulation by modulating sections 109-1 to 109-$m$ and RF transmitting sections 110-1 to 110-$m$ (303), and a plurality of symbols corresponding to all bits in the codeword are transmitted at the same time from the transmitting antennas (304). Moreover, a control signal which is generated by a control signal generating section (not shown) and includes coding information, information of the number of retransmissions, information of the spatial multiplexing number and information of the modulation scheme is transmitted at the same time (305).

The plurality of symbols and the control signal transmitted from a plurality of transmitting antennas are received by RF receiving sections 201-1 to 201-$n$ through the receiving antennas at the MIMO receiving apparatus. The control signal is outputted to control signal demodulating section 202. The received signals where a plurality of symbols are mixed and which are received at the receiving antennas, are outputted to MIMO demodulating section 203.

After demodulation of the control signal by control signal demodulating section 202, the modulation schemes and spatial multiplexing numbers at modulating sections 109-1 to 109-$m$ on the transmitting side are reported to MIMO demodulating section 203, and demultiplexing and demodulation of a plurality of symbols mixed in the received signals are carried out by MIMO demodulating section 203 (306). In this way, the bits (that is, codeword) included in the symbols transmitted at the same time from the transmitting antennas on the transmitting side are outputted to intra-codeword deinterleaver 205.

On the other hand, after control signal demodulating section 202 demodulates the control signal, the number of retransmissions is reported to interleave pattern table 204. Here, this is initial transmission, 0 is reported as the number of retransmissions, and an interleave pattern corresponding to the number of retransmissions 0 is reported from interleave pattern table 204 to intra-codeword deinterleaver 205. That is, when, for example, interleave pattern table 204 is as shown in FIG. 2, pattern 0 corresponding to the number of retransmissions 0 is reported to intra-codeword deinterleaver 205.

Intra-code word deinterleaver 205 then rearranges the bits in the codeword so as to restore the original states before interleaved based on the interleave pattern corresponding to the number of retransmissions (307). In other words, intra-codeword deinterleaver 205 restores the original states before subjected to intra-codeword interleaving by intra-codeword interleaver 105 on the transmitting side.

When the intra-codeword deinterleaving ends, a predetermined number of bits in the codeword are accumulated in deinterleaver 206. Deinterleaver 206 restores the original states before interleaved by interleaver 103 on the transmitting side. Rate dematching section performs rate dematching according to the coding information. All bits after rate dematching are subjected to a soft decision by LLR generating section 208, and the obtained LLR values are stored in LLR storing section 209 and also outputted to FEC decoding section 210.

The LLR values outputted from LLR generating section 208 correspond to all the information bits and redundant bits outputted from FEC coding section 101 on the transmitting side and are subjected to error correction decoding by FEC decoding section 210 (308). The LLR values corresponding to the information bits after error correction decoding are subjected to a hard decision, and information bits are obtained. Error detecting section 211 carries out error detection using an error detection code added to the information bits (309), reports the error detection result to retransmission request generating section 212 and also outputs the information bits as received data when no error is detected.

As the result of such an error detection, when errors are detected in the information bits, a retransmission request is generated by retransmission request generating section 212 and is fed back to the MIMO transmitting apparatus (310).

The fed back retransmission request is inputted to buffer 104 and counter 106 of the MIMO transmitting apparatus, the transmission bits stored in buffer 104 are outputted again to intra-codeword interleaver 105, and the number of retransmissions is counted as 1 by counter 106. The number of retransmissions counted by counter 106 is outputted to interleave pattern table 107, and an interleave pattern corresponding to the number of retransmissions is reported to intra-codeword interleaver 105 from interleave pattern table 107.

Intra-codeword interleaver 105 then carries out intra-codeword interleaving on the transmission bits outputted from buffer 104 using an interleave pattern different from initial transmission (311). Here, the number of retransmissions is 1, and intra-codeword interleaving according to an interleave pattern corresponding to the number of retransmissions 1 is carried out. That is, when, for example, interleave pattern table 107 is as shown in FIG. 2, interleaving on the bits in the codeword is carried out according to pattern 1 corresponding to the number of retransmissions 1.

In this way, bits in the codeword are interleaved using an interleave pattern different for each retransmission, and bits in the codeword are transmitted from transmitting antennas different for each retransmission or transmitted from the same transmitting antennas by changing bit positions in a symbol for each retransmission.

That is, when attention is focused on one bit, this bit is arranged at a position different from initial transmission upon first retransmission, so that it is possible to transmit the bit from different transmitting antennas. Moreover, a diversity effect is obtained by a difference in the channel between transmitting antennas and the MIMO receiving apparatus, so that it is possible to further improve the PER performance of this bit compared to the case where transmission is carried out from the same transmitting antenna as initial transmission upon retransmission.

Furthermore, when the above bit is subjected to M-ary modulation based on a modulation scheme such as, for example, 16 QAM and 64 QAM, this bit is rearranged at a position in the codeword different from initial transmission and first retransmission, so that, even when the bit is transmitted from the same transmitting antenna, the bit position in the symbol can be changed. That is, when, for example, the modulation scheme is 16 QAM, four bits are included in one symbol, but the reliability of demodulation differs depending on the bit position in the symbol, and these bits are divided into higher 2 bits and lower 2 bits according to the reliability.

Therefore, by carrying out intra-codeword interleaving for each retransmission, it is possible to rearrange a bit which is a lower bit in the symbol upon initial transmission to a higher bit in the symbol upon retransmission. Thus, one bit is prevented from always being a lower bit, and the PER performance can be improved.

In this way, intra-codeword interleaving is carried out using an interleave pattern different for each retransmission, so that it is possible to improve the PER performance of a codeword and reduce the number of retransmissions as a result. Furthermore, as described above, the codeword is formed with bits included in symbols transmitted at the same time from a plurality of transmitting antennas, and is formed with at most several tens of bits specified by the number of the transmitting antennas and the modulation scheme. Therefore, it is possible to realize fine control in units of several tens of bits transmitted in one symbol time.

When intra-codeword interleaving is carried out, as in the initial transmission, the bits in the codeword are distributed to the transmitting antennas, subjected to transmission processing such as modulation (312), and a plurality of symbols corresponding to all bits in the codeword are retransmitted at the same time from the transmitting antennas (313). Furthermore, as in the initial transmission, a control signal including coding information, information of the number of retransmissions, information of the spatial multiplexing number and information of the modulation scheme is transmitted at the same time (314).

A plurality of symbols and a control signal transmitted from a plurality of transmitting antennas are received by the MIMO receiving apparatus as in the initial transmission. The control signal is demodulated by control signal demodulating section 202. A plurality of symbols are demultiplexed and demodulated by MIMO demodulating section 203 (315). Thus, the bits (that is, codeword) included in the symbols retransmitted at the same time from the transmitting antennas on the transmitting side are outputted to intra-codeword deinterleaver 205. However, the sequence of these bits is different from that of the initial transmission.

On the other hand, the number of retransmissions included in the control signal is reported to interleave pattern table 204. Here, the number of retransmissions is 1, 1 is reported as the number of retransmissions, and the interleave pattern corresponding to the number of retransmissions 1 is reported from interleave pattern table 204 to intra-codeword deinterleaver 205. That is, when, for example, interleave pattern table 204 is as shown in FIG. 2, pattern 1 corresponding to the number of retransmissions 1 is reported to intra-codeword deinterleaver 205.

Therefore, intra-codeword deinterleaver 205 rearranges bits in the codeword so as to restore the original states before interleaved based on an interleave pattern corresponding to the number of retransmissions (316). Next, as in the initial transmission, bits in the codeword are deinterleaved by deinterleaver 206 and subjected to rate dematching by rate dematching section 207. All bits after rate dematching are subjected to a soft decision by LLR generating section 208 and the obtained LLR values are combined with the LLR values of the initial transmission stored in LLR storing section 209 (317). The obtained combined LLR value is stored in LLR storing section 209 and also outputted to FEC decoding section 210.

In this way, by combining LLR values obtained through a soft decision for each retransmission, the accuracy of error correction decoding for each retransmission improves. Especially in the present embodiment, intra-codeword interleaving is carried out using an interleave pattern different for each retransmission, and therefore there is no such a bias that the same bits are always transmitted through a poor channel. Therefore, by combining LLR values for each retransmission, it is possible to substantially improve the accuracy of error correction decoding.

Hereinafter, as in the initial transmission, the combined LLR value is subjected to error correction decoding by FEC decoding section 210 (318), and is subjected to error detection by error detecting section 211 (319). Information bits are outputted as received data or a retransmission request is further fed back to the MIMO transmitting apparatus.

Next, an interleave pattern will be described with a specific example. In the following description, interleave pattern table 107 is as shown in FIG. 2.

FIG. 5 shows an example of the interleave pattern when the MIMO transmitting apparatus has three transmitting antennas (ANT1, ANT2 and ANT3) and symbols modulated based on QPSK are transmitted from transmitting antennas. When there are three transmitting antennas and the modulation scheme is QPSK, a codeword is formed with 6 bits (=3 antennas×2 bits).

Figure 5A:
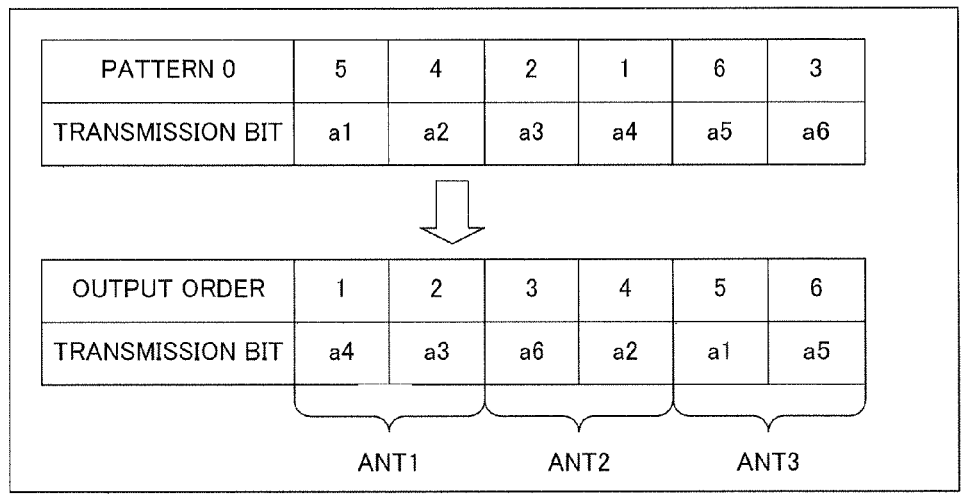
FIG. 5A shows an example of an interleave pattern according to Embodiment 1.

As described above, upon initial transmission, pattern 0 is reported to intra-codeword interleaver 105 from interleave pattern table 107. Therefore, when bits a1 to a6 included in the codeword are inputted to intra-codeword interleaver 105, pattern 0 shown in the upper part of FIG. 5A is applied, and bits a1 to a6 are outputted to bit allocating section 108 in the output order shown in the lower part of FIG. 5A. These bits a1 to a6 are allocated by bit allocating section 108 to modulating sections 109-1 to 109-3 corresponding to transmitting antennas ANT1 to ANT3, respectively. Here, all modulating sections 109-1 to 109-3 employ QPSK as the modulation scheme, and bits a1 to a6 are distributed and outputted to the modulating sections by two bits each. As a result, a symbol including bits a4 and a3 is transmitted from transmitting antenna ANT1, a symbol including bits a6 and a2 is transmitted from transmitting antenna ANT2, and a symbol including bits a1 and a5 is transmitted from transmitting antenna ANT3 at the same time, respectively.

Figure 5B:
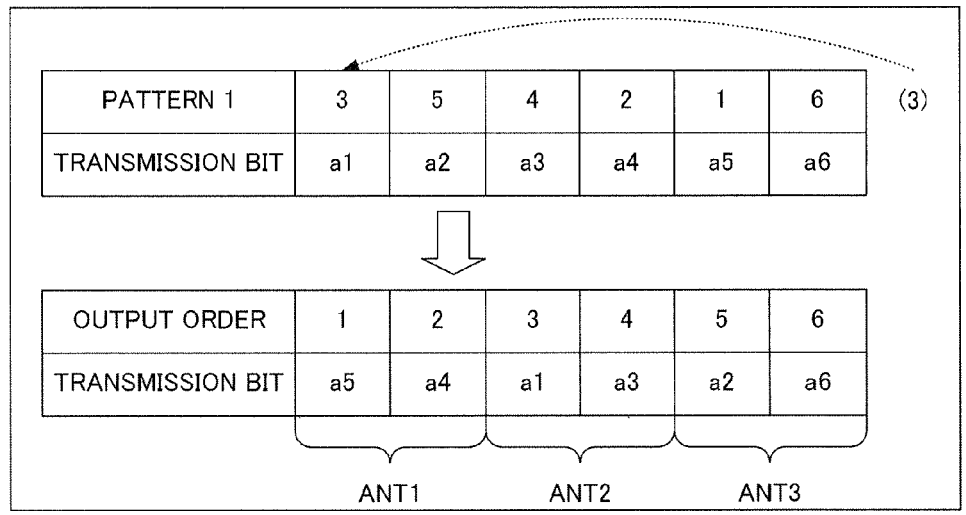
FIG. 5B is a diagram continued from FIG. 5A.

After such initial transmission is carried out, when a retransmission request is fed back from the MIMO receiving apparatus, first retransmission is carried out. As described above, upon first retransmission, pattern 1 is reported from interleave pattern table 107 to intra-codeword interleaver 105. Therefore, when bits a1 to a6 included in the codeword are inputted to intra-codeword interleaver 105, pattern 1 shown in the upper part of FIG. 5B is applied, and bits a1 to a6 are outputted to bit allocating section 108 in the output order shown in the lower part of FIG. 5B. As shown in the upper part of FIG. 5B, in pattern 1, rearmost output order 3 of pattern 0 moves to the head, and other output orders 5, 4, 2, 1 and 6 are shifted backward by one. However, the relationship between the patterns is not limited to this, and, for example, the patterns may be random.

As a result of intra-codeword interleaving according to such pattern 1, a symbol including bits a5 and a4 is transmitted from transmitting antenna ANT1, a symbol including bits a1 and a3 is transmitted from transmitting antenna ANT2, and a symbol including bits a2 and a6 is transmitted from transmitting antenna ANT3 at the same time, respectively.

Figure 5C:
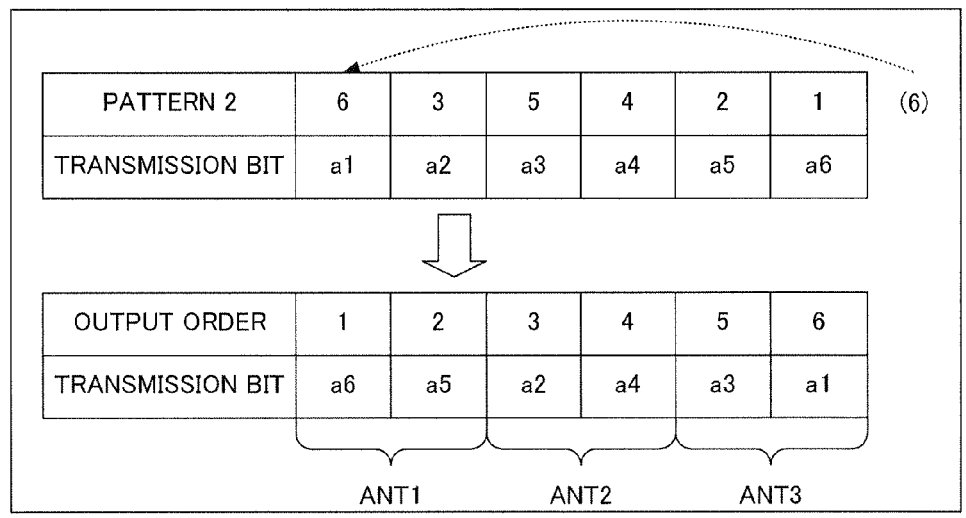
FIG. 5C is a diagram continued from FIG. 5B.

In the same way, upon second retransmission, pattern 2 shown in the upper part of FIG. 5C is applied. As a result of intra-codeword interleaving according to pattern 2, a symbol including bits a6 and a5 is transmitted from transmitting antenna ANT1, a symbol including bits a2 and a4 is transmitted from transmitting antenna ANT2, and a symbol including bits a3 and a1 is transmitted from transmitting antenna ANT3 at the same time, respectively.

In this way, as a result of the intra-codeword interleaving according to such an interleave pattern, bits a1 to a6 are transmitted from transmitting antennas different from last transmission or at positions in the symbol different from last transmission, so that it is possible to improve the PER performance for each retransmission.

Furthermore, other specific examples will be described.

FIG. 6 shows an example of an interleave pattern when the MIMO transmitting apparatus has two transmitting antennas (ANT1 and ANT2), a symbol modulated by 16 QAM is transmitted from transmitting antenna ANT1, and a symbol modulated by QPSK is transmitted from transmitting antenna ANT2. When there are two transmitting antennas and their modulation schemes are 16 QAM and QPSK, a codeword is formed with 6 bits (=1 antenna×4 bits+1 antenna×2 bits).

Figure 6A:
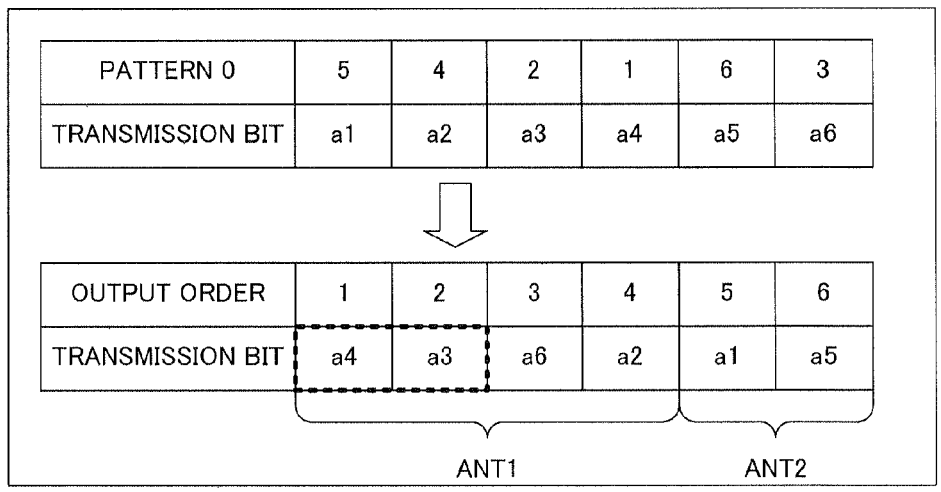
FIG. 6A shows another example of the interleave pattern according to Embodiment 1.

In such a case, upon initial transmission, pattern 0 shown in the upper part of FIG. 6A is applied. As a result of intra-codeword interleaving according to pattern 0, a symbol including bits a4, a3, a6 and a2 is transmitted from transmitting antenna ANT1, and a symbol including bits a1 and a5 is transmitted from transmitting antenna ANT2 at the same time, respectively.

Here, out of the four bits transmitted from transmitting antenna ANT1, bits a4 and a3 enclosed by the broken line in the lower part of FIG. 6A are higher order bits in the symbol and have high reliability upon demodulation.

Figure 6B:
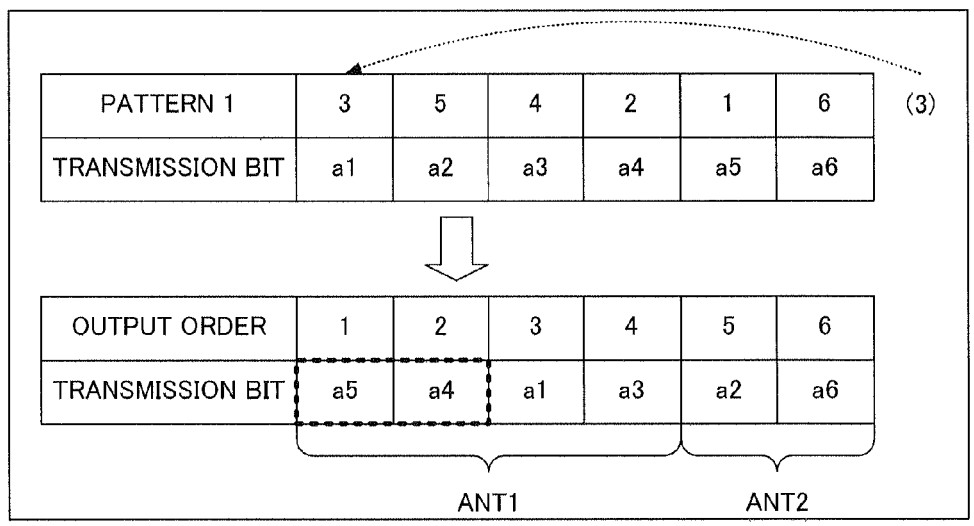
FIG. 6B is a diagram continued from FIG. 6A.
Figure 6C:
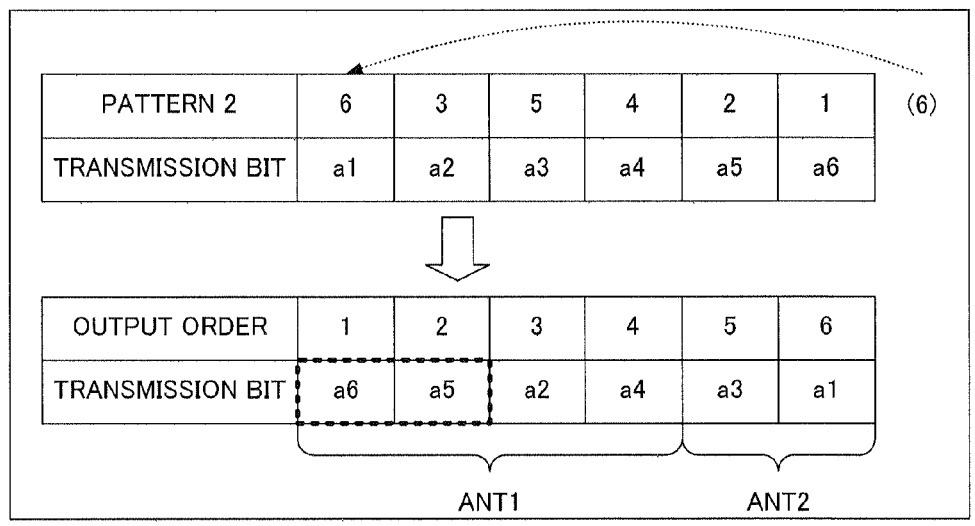
FIG. 6C is a diagram continued from FIG. 6B.

Likewise, upon first retransmission and second retransmission, bits a1 to a6 are allocated at the bit positions in the symbol and transmitted through the transmitting antennas, as shown in FIG. 6B and FIG. 6C. In this way, bits a1 to a6 are transmitted through transmitting antennas different from last transmission or at bit positions different from last transmission, so that it is possible to improve the PER performance for each retransmission.

As described above, according to the present embodiment, intra-codeword interleaving is carried out in units of all bits included in the symbols transmitted at the same time from a plurality of transmitting antennas, and the interleave pattern used for this intra-codeword interleaving is changed for each retransmission. Therefore, it is possible to realize relatively fine control in units of bits transmitted in one symbol time and carry out flexible control according to a change in the propagation environment. Furthermore, bits included in the codeword are transmitted from different transmitting antennas for each retransmission or transmitted at different bit positions allocated in a symbol for each retransmission, so that it is possible to equalize the occurrence of errors among bits and further reduce the number of retransmissions as a result.

Embodiment 2

Features of Embodiment 2 of the present invention include changing an interleave pattern used in intra-codeword interleaving according to a change in a propagation environment, modulation scheme or spatial multiplexing number.

Figure 7:
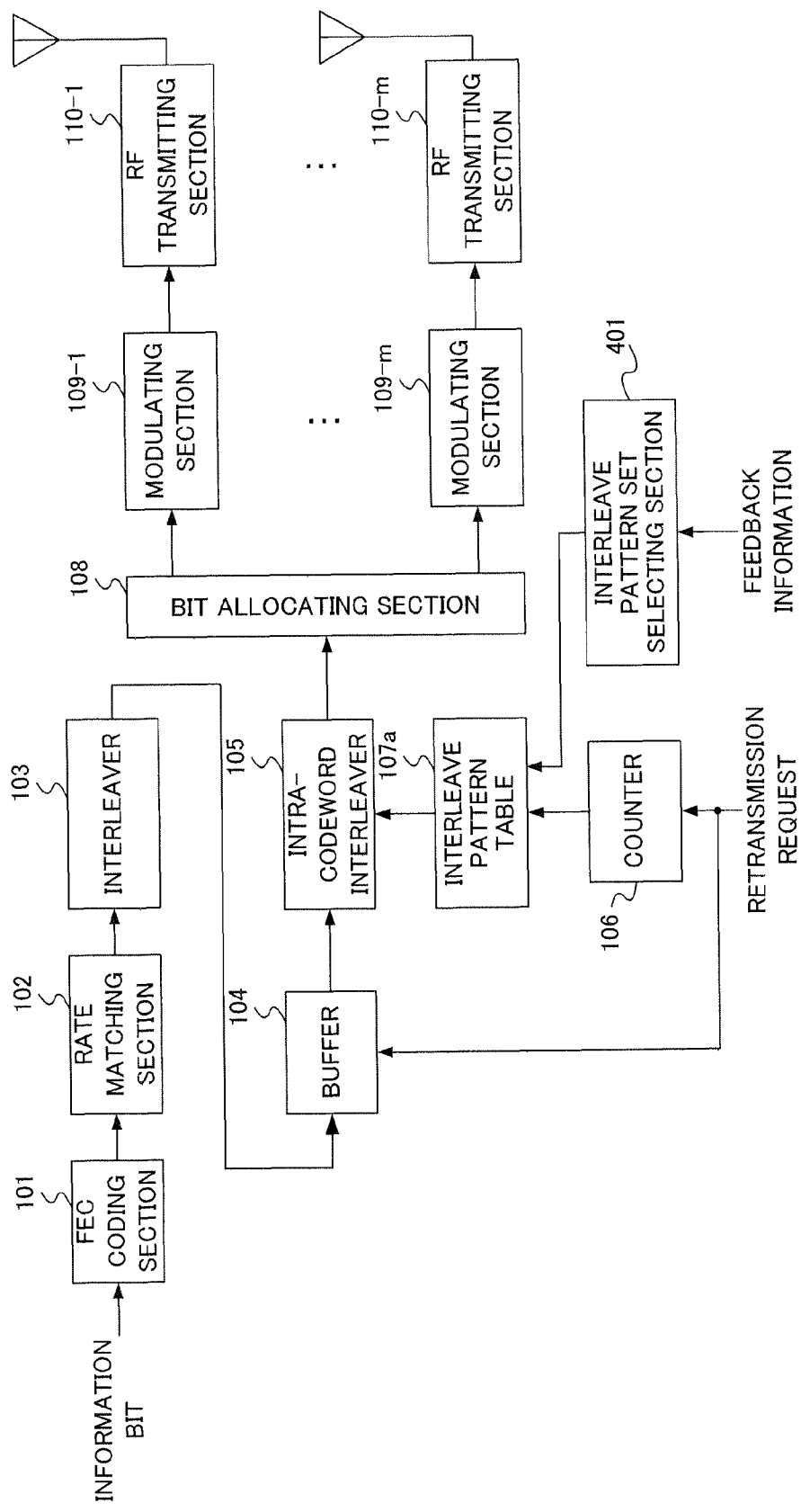
FIG. 7 is a block diagram showing the configuration of main components of a MIMO transmitting apparatus according to Embodiment 2 of the present invention.

FIG. 7 is a block diagram showing the configuration of main components of a MIMO transmitting apparatus according to Embodiment 2. In FIG. 7, the same components of FIG. 1 are assigned the same reference numerals and will not be described. The MIMO transmitting apparatus shown in FIG. 7 has FEC coding section 101, rate matching section 102, interleaver 103, buffer 104, intra-codeword interleaver 105, counter 106, interleave pattern table 107a, bit allocating section 108, modulating sections 109-1 to 109-$m$, RF transmitting sections 110-1 to 110-$m$ and interleave pattern set selecting section 401.

Interleave pattern table 107a stores interleave patterns corresponding to each number of retransmissions, used in intra-codeword interleaving, and reports an interleave pattern corresponding to the number of retransmissions to intra-codeword interleaver 105. However, unlike Embodiment 1, interleave pattern table 107a stores two types of interleave pattern groups (hereinafter referred to as "interleave pattern set") of an interleave pattern set emphasized on switch of transmitting antennas which transmit bits for each transmission, and an interleave pattern set emphasized on switch of higher order and lower order bit positions in the symbol for each transmission. That is, for example, as shown in FIG. 8, interleave pattern table 107a stores two types of interleave patterns in association with each other for the number of retransmissions 0, 1, 2, ... : the interleave pattern set of x0, x1, x2, ... emphasized on the switch of transmitting antennas, and the interleave pattern set of y0, y1, y2, ... emphasized on the switch of the higher order and lower order bit positions in the symbol. Patterns x0, x1, x2, ... and patterns y0, y1, y2, ... corresponding to the number of retransmissions are different from one another, and bits in the codeword are rearranged to different positions for each retransmission.

Interleave pattern set selecting section 401 selects one of interleave pattern sets in interleave pattern table 107a according to the feedback information fed back from the MIMO receiving apparatus.

Here, as will be described later, feedback information refers to information of the interleave pattern set determined by the MIMO receiving apparatus based on the number of independent paths in the channel or the like.

Figure 9:
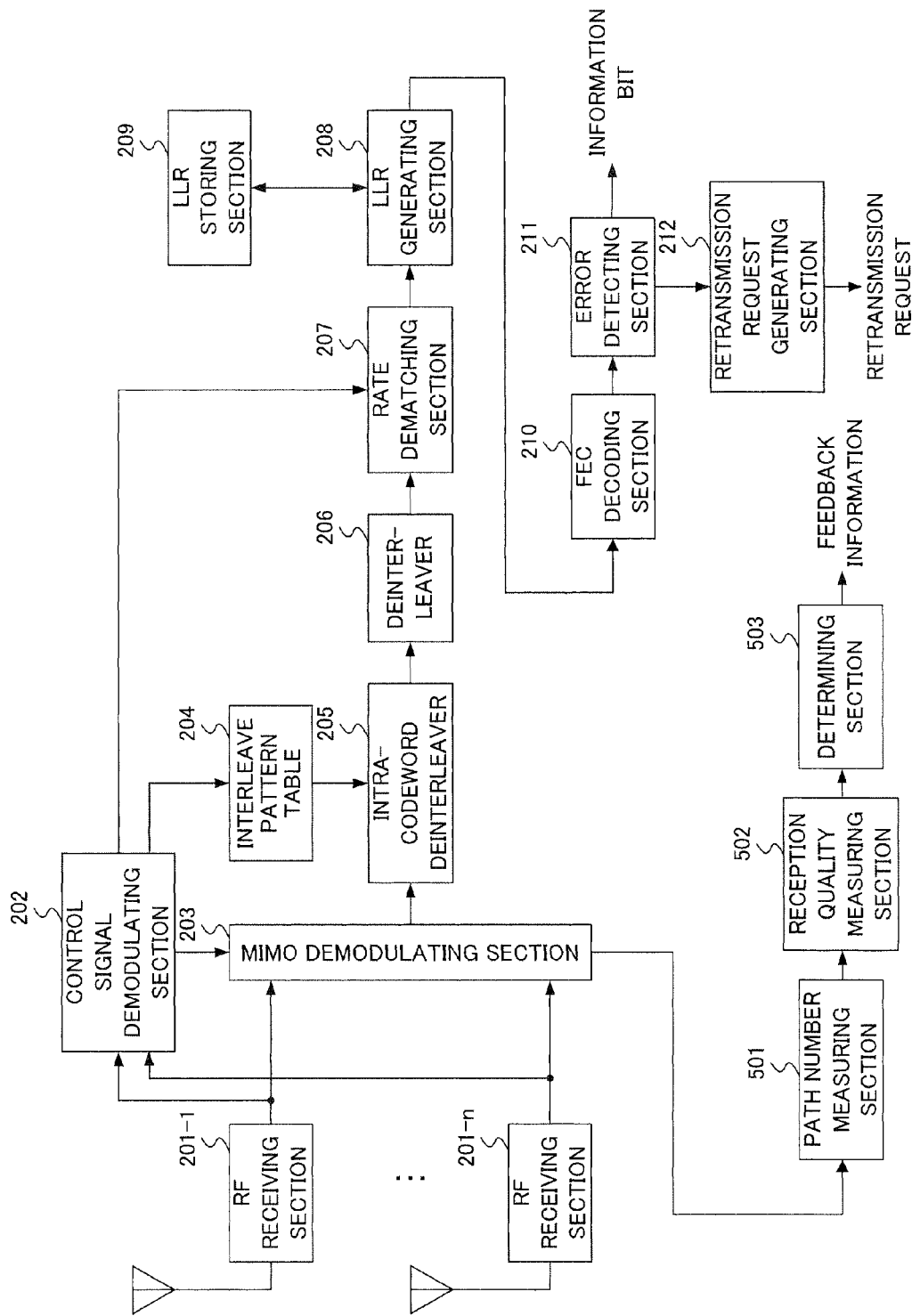
FIG. 9 is a block diagram showing the configuration of main components of a MIMO receiving apparatus according to Embodiment 2.

FIG. 9 is a block diagram showing the configuration of main components of a MIMO receiving apparatus according to Embodiment 2. In FIG. 9, the same components of FIG. 3 are assigned the same reference numerals and will not be described. The MIMO receiving apparatus shown in FIG. 9 has RF receiving sections 201-1 to 201-$n$, control signal demodulating section 202, MIMO demodulating section 203, interleave pattern table 204, intra-codeword deinterleaver 205, deinterleaver 206, rate dematching section 207, LLR generating section 208, LLR storing section 209, FEC decoding section 210, error detecting section 211, retransmission request generating section 212, path number measuring section 501, reception quality measuring section 502 and determining section 503.

Path number measuring section 501 measures the number of independent paths which can be demultiplexed in the channel based on the demultiplexing/demodulation result of symbols at MIMO demodulating section 203. Generally, in MIMO communication, the communication quality becomes better for the larger number of independent paths.

Reception quality measuring section 502 measures the reception quality of independent paths.

Determining section 503 determines which of an interleave pattern emphasized on switch of transmitting antennas or an interleave pattern emphasized on switch of higher order and lower order bit positions in the symbol should be selected based on the number of independent paths and the reception quality of paths, and takes the result as feedback information.

To be more specific, when there are relatively many independent paths and the reception quality of paths is relatively good, a propagation environment is suitable for MIMO communication, and therefore determining section 503 determines that the spatial multiplexing number will increase and then selects the interleave pattern emphasized on switch of transmitting antennas. On the other hand, when there are relatively few independent paths or the reception quality of paths is relatively poor, a propagation environment is not suitable for MIMO communication, and therefore determining section 503 determines that the spatial multiplexing number will decrease and selects the interleave pattern emphasized on switch of higher order and lower order bit positions in the symbol.

In the present embodiment, the number of independent paths in the channel is measured by path number measuring section 501 in the MIMO receiving apparatus, the reception quality of paths is measured by reception quality measuring section 502, and an interleave pattern set is determined by determining section 503 based on the measurement results of the number of independent paths and the reception quality. At this time, when determining section 503 determines that the propagation environment is suitable for MIMO communication and different symbols are transmitted at the same time from a plurality of transmitting antennas, a great diversity effect can be obtained by switching transmitting antennas for each retransmission, and therefore determining section 503 selects the corresponding interleave pattern set. On the other hand, when determining section 503 determines that the propagation environment is not suitable for MIMO communication and the same symbols are transmitted at the same time from a plurality of transmitting antennas, there is a high possibility that no change from last transmission will occur even if transmitting antennas are switched for each retransmission, and therefore determining section 503 selects an interleave pattern emphasized on switch of higher order and lower order bit positions.

The selection result is fed back to the MIMO transmitting apparatus as feedback information. Interleave pattern set selecting section 401 in the MIMO transmitting apparatus selects one of the interleave pattern sets stored in interleave pattern table 107a.

An interleave pattern corresponding to the number of retransmissions in the selected interleave pattern set is then reported to intra-codeword interleaver 105, and different intra-codeword interleaving for each retransmission is carried out. Here, as described above, a pattern of an interleave pattern set corresponding to the propagation environment is applied to intra-codeword interleaving, so that it is possible to reduce the number of retransmissions most efficiently.

As described above, according to the present embodiment, two types of interleave pattern sets of an interleave pattern set of switching transmitting antennas for each retransmission and an interleave pattern set of switching higher order and lower order bit positions in a symbol for each retransmission, are stored, one of the interleave pattern sets is selected according to whether or not the propagation environment is suitable for MIMO communication, and intra-codeword interleaving is carried out based on an interleave pattern corresponding to the number of retransmissions in the selected interleave pattern set. Therefore, it is possible to prepare a plurality of interleave pattern sets, use an interleave pattern set suitable for a propagation environment and reduce the number of retransmissions most efficiently.

Although, according to the present embodiment, the receiving apparatus determines an interleave pattern set and the transmitting apparatus selects an interleave pattern set according to feedback information from the receiving apparatus, the transmitting apparatus may determine an interleave pattern set. That is, for example, when M-ary modulation such as 16 QAM and 64 QAM is not carried out as a result of adaptive modulation at the transmitting apparatus, an interleave pattern set of switching transmitting antennas is selected. Meanwhile, when a spatial multiplexing number is small and M-ary modulation is carried out, an interleave pattern set of switching higher order and lower order bit positions is selected.

Embodiment 3

Features of Embodiment 3 of the present invention include repeating error correction decoding on the receiving side and further improving an PER performance.

The MIMO transmitting apparatus according to the present embodiment has the same configuration as Embodiment 1 (FIG. 1), and will not be described.

Figure 10:
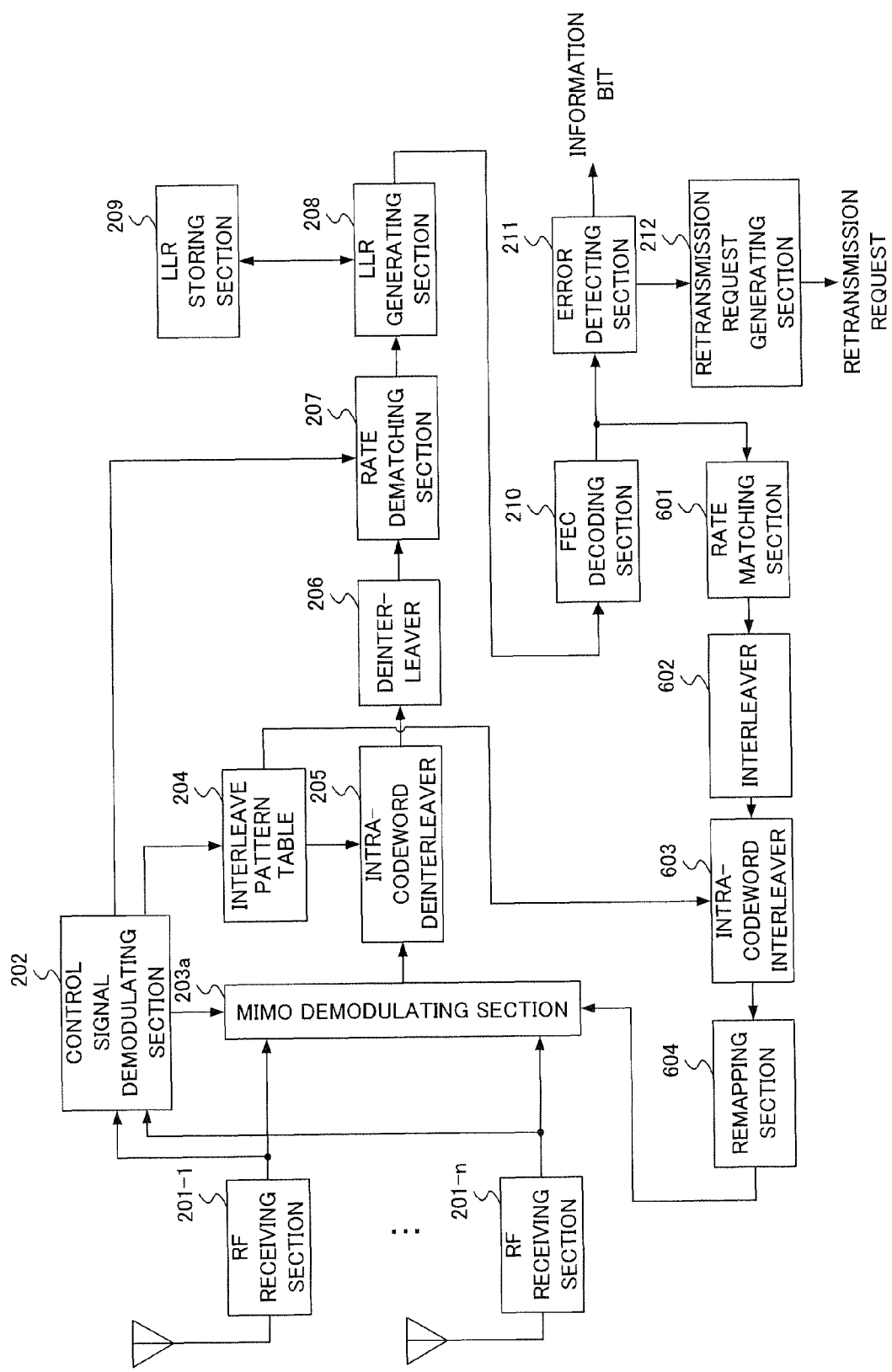
FIG. 10 is a block diagram showing the configuration of main components of a MIMO receiving apparatus according to Embodiment 3 of the present invention.

FIG. 10 is a block diagram showing the configuration of main components of a MIMO receiving apparatus according to Embodiment 3. In FIG. 10, the same components in FIG. 3 are assigned the same reference numerals and will not be described. The MIMO receiving apparatus shown in FIG. 10 has RF receiving sections 201-1 to 201-n, control signal demodulating section 202, MIMO demodulating section 203a, interleave pattern table 204, intra-codeword deinterleaver 205, deinterleaver 206, rate dematching section 207, LLR generating section 208, LLR storing section 209, FEC decoding section 210, error detecting section 211, retransmission request generating section 212, rate matching section 601, interleaver 602, intra-codeword interleaver 603 and remapping section 604.

MIMO demodulating section 203a demultiplexes/demodulates symbols transmitted from transmitting antennas on the transmitting side using a spatial multiplexing number, modulation scheme and replica symbols outputted from remapping section 604. MIMO demodulating section 203a differs from Embodiment 1 in demultiplexing/demodulating symbols using replica symbols as outside information generated from the error correction decoding result by FEC decoding section 210 in the process of iterative decoding.

Rate matching section 601 carries out rate matching similar to rate matching section 102 in the MIMO transmitting apparatus on the error correction decoding result by FEC decoding section 210.

Interleaver 602 carries out interleaving similar to interleaver 103 in the MIMO transmitting apparatus on the bits after the rate matching.

Intra-codeword interleaver 603 carries out intra-codeword interleaving on the interleaved bits according to the number of retransmissions similar to intra-codeword interleaver 105 in the MIMO transmitting apparatus.

Remapping section 604 carries out symbol mapping on the bits after intra-codeword interleaving and generates replica symbols similar to the symbols generated by the MIMO transmitting apparatus.

According to the present embodiment, in the process of iterative decoding at the MIMO receiving apparatus, replica symbols of symbols transmitted from the MIMO transmitting apparatus are generated, and the replica symbols are used as outside information upon demodulation of a received signal.

Therefore, the demodulation accuracy increases, and the PER performance further improves.

In the process of iterative decoding, it is necessary to carry out intra-codeword interleaving similar to intra-codeword interleaving at the MIMO transmitting apparatus, interleave pattern table 204 in the MIMO receiving apparatus reports an interleave pattern corresponding to the number of retransmissions to intra-codeword interleaver 603.

By carrying out iterative decoding in this way, it is possible at MIMO demodulating section 203a to accurately demultiplex/demodulate symbols included in the received signal and further improve the PER performance.

As described above, according to the present embodiment, iterative decoding is carried out, and demodulation is carried out using replica symbols formed with the bits subjected to intra-codeword interleaving in the same way as on the transmitting side, in the process of iterative decoding. Therefore, the demodulation accuracy can be improved, and the PER performance can be further improved.

Although cases have been described with the above embodiments where the configuration is employed of providing a normal interleaver together with an intra-codeword interleaver, a configuration without any normal interleaver may be employed.

Also, in the above embodiments, a case has been described as an example where the present invention is configured by hardware. However, the present invention can also be realized by software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC", system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The MIMO transmitting apparatus according to a first aspect of the present invention has a plurality of transmitting antennas and employs a configuration including: an error correction coding section that carries out error correction coding on information bits and generates transmission bits; an interleaving section that carries out interleaving in a codeword formed with bits transmitted at the same time from the plurality of transmitting antennas out of the generated transmission bits; and a transmitting section that transmits at the same time all bits included in the interleaved codeword from the plurality of antennas, wherein, when the codeword is retransmitted, the interleaving section carries out interleaving in the codeword using an interleave pattern different from last transmission.

According to this configuration, interleaving in a codeword formed with the bits transmitted at the same time from a plurality of transmitting antennas is carried out using different interleave patterns for each retransmission, so that it is possible to carry out fine control in units of several tens of bits transmitted in one symbol time and equalize the occurrence of errors among bits for each retransmission. As a result, it is possible to realize flexible control according to a change in a propagation environment and further reduce the number of retransmissions.

The MIMO transmitting apparatus according to a second aspect of the present invention employs a configuration in the above first aspect, wherein the interleaving section has: a counter that counts a retransmission request fed back from a communicating party; and an interleave pattern table that stores mutually different interleave patterns corresponding to the counted number of retransmission requests.

According to this configuration, mutually different interleave patterns corresponding to the number of retransmission requests fed back from the communicating party are stored, so that it is possible to readily carry out interleaving using a different interleave pattern for each retransmission.

The MIMO transmitting apparatus according to a third aspect of the present invention employs a configuration in the above first aspect, wherein the interleaving section sets a number of bits according to modulation schemes of the mutually different symbols transmitted at the same time from the plurality of transmitting antennas as the codeword.

According to this configuration, bits to be a codeword are defined by the number of different symbols transmitted at the same time and the number corresponding to the modulation scheme of symbols, so that it is possible to obtain the number of bits included in the codeword from a spatial multiplexing number and an M-ary modulation number in advance.

The MIMO transmitting apparatus according to a fourth aspect of the present invention employs a configuration in the above first aspect, wherein the interleaving section carries out interleaving in the codeword using an interleave pattern where the same bits are allocated to a transmitting antenna different from the last transmission.

According to this configuration, the same bits are allocated to a transmitting antenna different from last transmission, so that it is possible to obtain a diversity effect by retransmission and improve the PER performance.

The MIMO transmitting apparatus according to a fifth aspect of the present invention employs a configuration in the above first aspect, wherein the interleaving section carries out interleaving in the codeword using an interleave pattern where the same bits are allocated to bit positions in the symbol different from the last transmission.

According to this configuration, the same bits are allocated at bit positions different from last transmission, and therefore the same bits never continue to be always lower order bits, so that it is possible to improve the PER performance.

The MIMO transmitting apparatus according to a sixth aspect of the present invention employs a configuration in the above first aspect, wherein the interleaving section has: a counter that counts a retransmission request fed back from a communicating party; an interleave pattern table that stores a first interleave pattern group including an interleave pattern where the same bits are allocated to a transmitting antenna different from the last transmission and a second interleave pattern group including an interleave pattern where the same bits are allocated to bit positions different from the last transmission in the symbol; and a selecting section that selects one of the first interleave pattern group and the second interleave pattern group, and carries out interleaving in the codeword using an interleave pattern corresponding to the counted number of retransmission requests in the selected interleave pattern group.

According to this configuration, one of the two types of different properties is selected, and intra-codeword interleaving is carried out for each retransmission, so that it is possible to select an interleave pattern group corresponding to, for example, a propagation environment and efficiently reduce the number of retransmissions.

The MIMO transmitting apparatus according to a seventh aspect of the present invention employs a configuration in the above sixth aspect, wherein the selecting section selects the first interleave pattern group, when the number of independent paths in a channel with the communicating party is equal to or larger than a predetermined number and when reception quality of independent paths is equal to or higher than predetermined quality.

The MIMO transmitting apparatus according to an eighth aspect of the present invention employs a configuration in the above sixth aspect, wherein the selecting section selects the second interleave pattern group, when the number of independent paths in the channel with the communicating party is smaller than a predetermined number or when reception quality of independent paths is equal to or lower than predetermined quality.

The MIMO transmitting apparatus according to a ninth aspect of the present invention employs a configuration in the above sixth aspect, wherein the selecting section selects the first interleave pattern group when all symbols transmitted from the plurality of transmitting antennas are not subjected to M-ary modulation.

The MIMO transmitting apparatus according to a tenth aspect of the present invention employs a configuration in the above sixth aspect, wherein the selecting section selects the second interleave pattern group when one of symbols transmitted from the plurality of transmitting antennas is subjected to M-ary modulation and when the symbols less than a predetermined number of mutually different symbols are transmitted from the plurality of transmitting antennas.

According to these configurations, when the propagation environment is suitable for MIMO communication and the spatial multiplexing number is large, the same bits are allocated to a transmitting antenna different from last transmission. Meanwhile, when the propagation environment is not suitable for MIMO communication and the spatial multiplexing number is small, the same bits are allocated to bit positions in the symbol different from last transmission. Therefore, it is possible to carry out most efficient intra-codeword interleaving and further reduce the number of retransmissions according to whether or not the propagation environment is suitable for MIMO communication.

The MIMO receiving apparatus according to an eleventh aspect of the present invention employs a configuration including: a receiving section that receives a codeword formed with bits transmitted at the same time from a plurality of transmitting antennas provided to a communicating party; a deinterleaving section that carries out deinterleaving corresponding to interleaving by the communicating party on the bits in the received codeword; and an error correction decoding section that carries out error correction decoding on the deinterleaved codeword.

According to this configuration, deinterleaving in the codeword formed with the bits transmitted at the same time from the plurality of transmitting antennas provided to the communicating party is carried out corresponding to interleaving by the communicating party, so that it is possible to correctly receive signals transmitted after fine control in codeword units.

The MIMO receiving apparatus according to a twelfth aspect of the present invention employs a configuration in the above eleventh aspect, further including: an interleaving section that carries out the same interleaving as the interleaving by the communicating party on the bits in the codeword after the error correction decoding; a mapping section that carries out symbol mapping on the interleaved codeword and generates replicas of symbols transmitted at the same time from the plurality of transmitting antennas provided to the communicating party; and a demodulating section that demodulates the codeword received by the receiving section using the generated replicas.

According to this configuration, the received codeword is demodulated using the replicas generated from the error correction decoding result, so that it is possible to repeat demodulation and error correction decoding, improve the accuracy of demodulation and further improve the PER performance.

The retransmission method according to a thirteenth aspect of the present invention for a multi input multi output transmitting apparatus that has a plurality of transmitting antennas, includes the steps of: carrying out error correction coding on information bits and generating transmission bits; carrying out interleaving in a codeword formed with bits transmitted at the same time from the plurality of transmitting antennas out of the generated transmission bits; transmitting at the same time all bits included in the interleaved codeword from the plurality of antennas; and carrying out interleaving in the codeword using an interleave pattern different from last transmission when the codeword is retransmitted.

According to this method, interleaving in the codewords transmitted at the same time from a plurality of transmitting antennas is carried out using a different interleave pattern for each retransmission, so that it is possible to carry out fine control in units of several tens of bits transmitted in one symbol time and equalize the occurrence of errors among bits for each retransmission. As a result, it is possible to realize flexible control according to a change in a propagation environment and further reduce the number of retransmissions.

The present application is based on Japanese Patent Application No. 2005-095344, filed on Mar. 29, 2005, the entire content of expressly incorporated by reference herein.

INDUSTRIAL APPLICABILITY

The MIMO transmitting apparatus, MIMO receiving apparatus and retransmission method according to the present invention can realize flexible control according to a change in a propagation environment and further reduce the number of retransmissions, and can be applied, for example, to a MIMO transmitting apparatus, MIMO receiving apparatus and retransmission method for randomizing errors by interleaving bits to be transmitted.

The invention claimed is:

1. A multi input multi output transmitting apparatus that comprises a plurality of transmitting antennas, the multi input multi output transmitting apparatus comprising:

an error correction coding section that carries out error correction coding of information bits to generate transmission bits, wherein the transmission bits comprise a plurality of bits;

an interleaving section that carries out interleaving of the plurality of bits, wherein the interleaved plurality of bits form symbols to be simultaneously transmitted from the plurality of transmitting antennas; and a transmitting section that simultaneously transmits the symbols formed by the interleaved plurality of bits from the plurality of transmitting antennas, wherein, when the plurality of bits are retransmitted, the interleaving section carries out interleaving of the plurality of bits using an interleave pattern which is different from an interleave pattern used in a last transmission, such that at least one bit of the plurality of bits is allocated to one of the transmitting antennas which is different from another one of the transmitting antennas to which the at least one bit was allocated in the last transmission.

2. The multi input multi output transmitting apparatus according to claim 1, wherein the interleaving section comprises:
a counter that counts a number of retransmission requests fed back from a communicating party; and
an interleave pattern table that stores mutually different interleave patterns corresponding to the counted number of retransmission requests.

3. The multi input multi output transmitting apparatus according to claim 1, wherein the interleaving section sets a number of the plurality of bits according to a modulation scheme, which is applied to each of the mutually different symbols simultaneously transmitted from the plurality of transmitting antennas.

4. The multi input multi output transmitting apparatus according to claim 1, wherein the interleaving section carries out the interleaving of the plurality of bits using an interleave pattern in which at least one bit of the plurality of bits is allocated to a bit position in a symbol which is different from a bit position to which the at least one bit was allocated in the last transmission.

5. The multi input multi output transmitting apparatus according to claim 1, wherein the interleaving section comprises:
a counter that counts a number of retransmission requests fed back from a communicating party;
an interleave pattern table that stores a first interleave pattern group including an interleave pattern in which at least one bit of the plurality of bits is allocated to one of the transmitting antennas which is different from another one of the transmitting antennas to which the at least one bit was allocated in the last transmission and a second interleave pattern group including an interleave pattern in which at least one bit of the plurality of bits is allocated to a bit position in a symbol which is different from a bit position to which the at least one bit was allocated in the last transmission; and
a selecting section that selects one of the first interleave pattern group and the second interleave pattern group,
wherein the interleaving section carries out the interleaving of the plurality of bits using an interleave pattern corresponding to the counted number of retransmission requests in the selected interleave pattern group.

6. The multi input multi output transmitting apparatus according to claim 5, wherein the selecting section selects the first interleave pattern group when a number of independent paths in a channel with the communicating party is equal to or larger than a predetermined number and when a reception quality of the independent paths is equal to or higher than a predetermined quality.

7. The multi input multi output transmitting apparatus according to claim 5, wherein the selecting section selects the second interleave pattern group when a number of independent paths in the channel with the communicating party is smaller than a predetermined number or when a reception quality of the independent paths is equal to or lower than a predetermined quality.

8. The multi input multi output transmitting apparatus according to claim 5, wherein the selecting section selects the first interleave pattern group when all symbols transmitted from the plurality of transmitting antennas are not subjected to M-ary modulation.

9. The multi input multi output transmitting apparatus according to claim 5, wherein the selecting section selects the second interleave pattern group when one of the symbols transmitted from the plurality of transmitting antennas is subjected to M-ary modulation and when less than a predetermined number of mutually different symbols are transmitted from the plurality of transmitting antennas.

10. A multi input multi output receiving apparatus comprising:
a receiving section that receives symbols, which are formed by a plurality of bits and which were simultaneously transmitted from a plurality of transmitting antennas provided to a communicating party;
a deinterleaving section that carries out deinterleaving of the plurality of bits, the deinterleaving corresponding to interleaving carried out by the communicating party; and
an error correction decoding section that carries out error correction decoding of the plurality of bits, which are deinterleaved,
wherein the receiving section is further configured to receive a plurality of bits which are retransmitted from the communicating party, in which the retransmitted plurality of bits are interleaved using an interleave pattern which is different from an interleave pattern used in a last transmission by the communicating party, such that at least one bit of the retransmitted plurality of bits is allocated to one of the transmitting antennas which is different from another one of the transmitting antennas to which the at least one bit was allocated in the last transmission.

11. The multi input multi output receiving apparatus according to claim 10, further comprising:
an interleaving section that carries out the same interleaving of the plurality of bits as the interleaving carried out by the communicating party after the error correction decoding;
a mapping section that carries out symbol mapping of the interleaved plurality of bits and generates replicas of symbols to be simultaneously transmitted from the plurality of transmitting antennas provided to the communicating party; and
a demodulating section that demodulates the plurality of bits received by the receiving section using the generated replicas.

12. A retransmission method for a multi input multi output transmitting apparatus that comprises a plurality of transmitting antennas, the retransmission method comprising:
carrying out error correction coding of information bits to generate transmission bits, wherein the transmission bits comprise a plurality of bits;
carrying out interleaving of the plurality of bits, wherein the interleaved plurality of bits form symbols to be simultaneously transmitted from the plurality of transmitting antennas;
simultaneously transmitting the symbols formed by the interleaved plurality of bits from the plurality of transmitting antennas; and
when the plurality of bits are retransmitted, carrying out interleaving of the plurality of bits using an interleave pattern which is different from an interleave pattern used in a last transmission, such that at least one bit of the plurality of bits is allocated to one of the transmitting antennas which is different from another one of the transmitting antennas to which the at least one bit was allocated in the last transmission.

\* \* \* \* \*